United States Patent [19]

Windle

[11] 3,797,610

[45] Mar. 19, 1974

[54] PIGMENTS

[76] Inventor: William Windle, Lobbs Folly, Sawles Rd., St. Austell, Cornwall, England

[22] Filed: Nov. 24, 1972

[21] Appl. No.: 309,503

Related U.S. Application Data

[63] Continuation-in-part of Ser. Nos. 84,951, Oct. 28, 1970, abandoned, and Ser. No. , , which is a continuation-in-part of Ser. No. 712,242, March 11, 1968, abandoned.

[30] Foreign Application Priority Data

Mar. 14, 1967 Great Britain.................... 12009/67

[52] U.S. Cl.............................. 106/306, 106/308 Q
[51] Int. Cl............................................... C09c 1/02
[58] Field of Search......................... 106/306, 308 Q

[56] References Cited
UNITED STATES PATENTS

| | | | |
|---|---|---|---|
| 2,034,797 | 3/1936 | Church et al....................... | 106/306 |
| 2,290,914 | 7/1942 | Machlin.............................. | 106/306 |
| 2,345,311 | 3/1944 | Wilson................................ | 106/306 |
| 2,346,243 | 4/1944 | Wilson................................ | 106/306 |
| 3,006,779 | 10/1961 | Leaf et al........................... | 106/306 |

OTHER PUBLICATIONS

Chemical Abstracts, Vol. 66, 116328e–116333c (1967).

*Primary Examiner*—Delbert E. Gantz
*Assistant Examiner*—J. V. Howard
*Attorney, Agent, or Firm*—Cushman, Darby & Cushman

[57] ABSTRACT

A method of preparing a stable suspension of a natural calcium carbonate pigment in water which comprises (a) forming an aqueous suspension containing from 70 to 85 percent by weight of natural calcium carbonate pigment, the natural calcium carbonate pigment comprising not more than 1 percent by weight of particles having an equivalent spherical diameter larger than 53 microns, and a dispersing agent which is a water-soluble anionic polymer, and (b) thoroughly agitating said suspension in the presence of the dispersing agent until at least 5 horsepower hours of energy per long ton of natural calcium carbonate pigment has been dissipated in the aqueous suspension.

5 Claims, 1 Drawing Figure

PATENTED MAR 19 1974
3,797,610
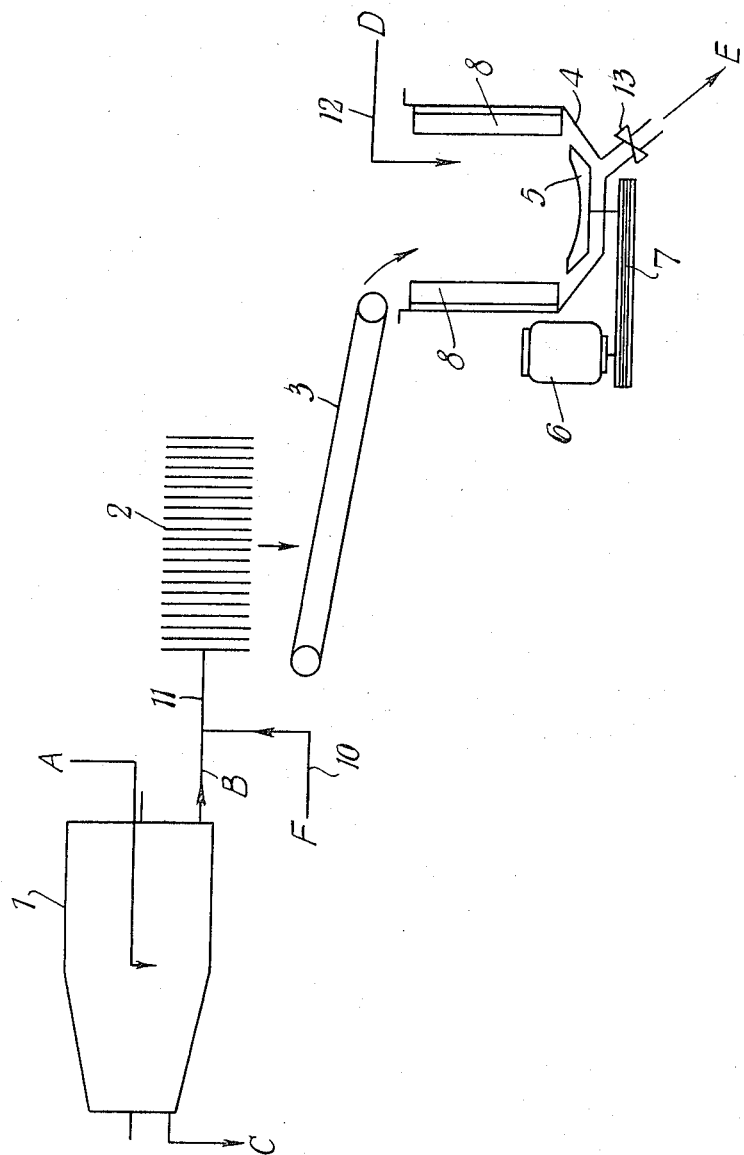
INVENTOR:
WILLIAM WINDLE
BY Cushman, Darby & Cushman
ATTORNEYS

PIGMENTS

This is a continuation-in-part application of my United States Patent application, Ser. No. 84,951 filed on Oct. 28, 1970 which was a continuation-in-part of my earlier United States Patent Application, Ser. No. 712,242, filed Mar. 11, 1968, both now abandoned.

BACKGROUND OF THE INVENTION

This invention relates to calcium carbonate pigments and, more particularly, is concerned with a method of preparing a stable suspension of a natural calcium carbonate pigment.

By "a stable suspension of a natural calcium carbonate pigment" there is meant herein a suspension of a natural calcium carbonate pigment from which there will be no appreciable sedimentation of the larger particles for at least 1 month after its preparation. This property is not to be confused with viscosity stability which depends upon different factors.

Calcium carbonate pigments can be classified as either precipitated calcium carbonate pigments or natural calcium carbonate pigments.

Precipitated calcium carbonate pigments are prepared by a chemical process in which the calcium carbonate is precipitated. The particle size distribution of the product is governed by the conditions under which the precipitation occurs, but there is generally obtained a product of relatively narrow particle size distribution. The product may comprise crystals of calcite or aragonite or a mixture of both forms. Various processes have been described in the literature for preparing viscosity stable suspensions of precipitated calcium carbonates, the processes described in U.S. Pat. Nos. 3,006,779 and 3,029,153 being two examples.

Natural calcium carbonate pigments are pigments formed from natural sources of calcium carbonate such as limestone, marble, chalk etc., and are often identified by such terms as natural whiting, ground whiting, fractionated whiting, etc. Natural calcium carbonate predominantly comprise calcite crystals. Natural calcium carbonate pigments are prepared by crushing, grinding and milling processes, and there is generally obtained a product having a relatively broad particle size distribution. The relatively broad particle size distribution of the pigment has an adverse affect on the stability of aqueous suspension of the pigment. Natural calcium carbonate pigments are being used increasingly in, for example, the paper industry. At present natural whiting made from chalk, limestone, vein calcite or calcite marble is transported, as a dry product, from the whiting manufacturer to the paper mills where it is slurried with water and then used either for paper filling or paper coating. Most of the methods of manufacturing natural whitings for use in the paper industry include one or more steps in which the whiting is processed as an aqueous slurry which is subsequently dried to a moisture content of about 2 percent by weight or less before being transported to the paper mills. Clearly, it would be more economic if the whiting could be transported as a suspension to the paper mills since this would avoid the need for the whiting to be dried at the manufacturers and reslurried at the paper mills. However, it has been found that the whiting slurry which is formed by the conventional methods of preparing whiting sediments after a short period and cannot, therefore, be transported and pumped.

It is an object of the present invention to provide a method of preparing a suspension of a natural calcium carbonate pigment which is sufficiently stable to enable it to be transported as a suspension, by road, rail or sea from the manufacturer thereof to the point of use, e.g., a paper mill.

SUMMARY OF THE INVENTION

Accordingly, the present invention provides a method of preparing a stable suspension of a natural calcium carbonate pigment in water which comprises (a) forming an aqueous suspension containing from 70 to 85 percent by weight of the natural calcium carbonate pigment, the natural calcium carbonate pigment comprising not more than 1 percent by weight of particles having an equivalent spherical diameter larger than 53 microns and no particles having an equivalent spherical diameter larger than 100 microns, and from 0.05 to 0.5 percent by weight, based on the weight of the natural calcium carbonate pigment, of a dispersing agent which is a water-soluble salt of an anionic polymer which has a number average molecular weight less than 10,000 and which contains from 30 to 100 molar percent of repeating units which can be represented by the formula:

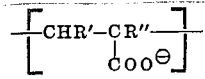

wherein R' is hydrogen, a carboxylic acid group or a methyl carboxylate group an R'' is hydrogen or a methyl group, and from zero to 70 molar percent of repeating units which can be represented by the formula:

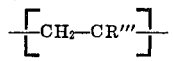

wherein R''' is chlorine, a methyl carboxylate group or phenyl; and (b) thoroughly agitating said suspension in the presence of the dispersing agent until there has been dissipated in the suspension at least 5 horsepower hours of energy per long ton of dry natural calcium carbonate pigment.

The natural calcium carbonate pigment should not contain more than 1 percent by weight, and preferably not more than 0.1 percent by weight, of particles of a size such as to be retained on a No. 300 mesh B.S. sieve (nominal aperture 53 microns), since the presence of such particles has an adverse effect on the stability of the suspension.

It has been found that the solids content of the suspension of natural calcium carbonate pigment should be in the range of from 70 to 85 percent by weight. With suspensions containing above 85 percent by weight of solids, the viscosity and dilatancy of the suspension are such that the suspension can no longer be pumped, and at solids contents below 70 percent by weight, the particles of natural calcium carbonate pigment begin to sediment out.

The dispersing agent used in the method of the present invention should be a water-soluble salt of an anionic polymer as defined above, which should be used in amount in the range 0.05 to 0.5 percent by weight based on the weight of dry natural calcium carbonate pigment. The anionic polymers useful in the present invention can be prepared by conventional processes.

DESCRIPTION OF THE PREFERRED EMBODIMENTS

The anionic polymers whose water-soluble salts are used as dispersing agents in the present invention preferably have a number average molecular weight in the range 1,000 to 5,000. The anionic polymers are used in the form of their water-soluble salts which can be, for example, the ammonium, sodium or potassium salts. Anionic polymers useful in the present invention include homopolymers of acrylic acid and methacrylic acid and copolymers containing at least 30 molar percent of repeating units derived from acrylic acid and/or methacrylic acid and/or maleic acid and/or citraconic acid and/or the half ester of maleic acid or citraconic acid, and up to 70 molar percent of vinyl acetate, vinyl chloride or styrene. Suitable copolymers for use in the present invention include copolymers of acrylic acid and vinyl acetate or vinyl chloride, copolymers of methacrylic acid and vinyl acetate, and copolymers of maleic acid and styrene or vinyl acetate.

The agitation of the aqueous suspension of chalk whiting can be carried out in a suitable mixer, e.g., a high shear mixer or a Cellier mixer made by Etablissements Cellier of Aix-les-Bains, France and described in British Pat. No. 1,116,656, and is continued until no lumps of undispersed material can be seen floating on the surface of the suspension and there has been dissipated in the suspension at least 5 horsepower hours of energy per long ton of dry chalk whiting. Generally, it will not be necessary for the amount of energy dissipated in the suspension to exceed 20 horsepower hours of energy per long ton of dry chalk whiting.

For a better understanding of the invention and to show how the same may be carried into effect, reference will now be made, by way of example, to the accompanying drawing which shows schematically a plant suitable for carrying out the method of the invention.

Referring to the accompanying drawing, a dispersed aqueous suspension of flint-free chalk A with a solids content of 25 percent by weight is fed to a continuous centrifuge 1, which performs a particle size separation yielding a first, fine fraction B comprising chalk whiting at least 60 percent by weight of which consists of particles smaller than 2 microns equivalent spherical diameter, less than 0.1 percent by weight of which consists of particles larger than 53 microns equivalent spherical diameter and none of which consists of particles larger than 100 microns, and a second fraction C comprising coarse chalk particles. A flocculating agent F, which can be a polyacrylamide or a copolymer of acrylamide with up to about 40 percent of acrylic acid, is added through pipe 10 to the first fraction and the flocculated suspension is introduced through conduit 11 into a filter press 2 in which it is dewatered. The cakes from the filter press, containing about 70 to 75 percent by weight of solids, are dropped on to an endless conveyor 3, which transports them to a high-shear mixer 4, to which a suitable quantity of a dispersing agent D is added through pipe 12. The high-shear mixer 4 contains an impeller 5 in the form of a turbine which is driven by an electric motor 6 by means of a belt drive 6. Baffles 8 are provided on the walls of the mixer 4 to suppress the formation of a vortex and to increase the turbulence in the mixer. If desired, the concentration of solids in the suspension may be increased by adding the required amount of dry powdered whiting of the required particle size. When a batch of chalk whiting has been sufficiently dispersed, i.e., when at least 5 horsepower hours of energy per long ton of dry chalk whiting have been dissipated in the suspension, the suspension is run to a suitable storage vessel E (not shown) by opening a valve 13 in the base of the mixer 4.

The invention is further illustrated by the following Examples.

EXAMPLE 1

A sample of natural chalk whiting was refined by a normal wet processing method which comprised grinding lumps of crude natural chalk in water containing 0.1 percent by weight, based on the weight of dry chalk, of a sodium polyacrylate dispersing agent having a number average molecular weight of 1,650. The grinding medium used was flint pebbles having diameters in the range 1/4 to 1½ inches (5 – 40 mm) and the grinding was continued for a time sufficient to disperse all of the chalk in the water and to free it from nodules of hard flint. The chalk suspension, which comprised 75 percent by weight of solids was then separated from the grinding pebbles and diluted with water to 20 percent by weight of solids. The diluted suspension was fed to a continuous scroll centrifuge and the fine product from the centrifuge was filterpressed to produce a product containing 75 percent by weight of particles smaller than 2 microns, 3 percent by weight of particles larger than 10 microns, 0.03 percent by weight of particles of a size such that they were retained on a No. 300 mesh B.S. sieve and no particles larger than 100 microns. This product was mixed with water in a commerical Cellier mixer to give an aqueous suspension containing 78 percent solids by weight. Prior to mixing operation 0.1 percent by weight, based on the weight of the chalk whiting, of a sodium polyacrylate dispersing agent having a number average molecular weight of 1,650 was added to the water and the mixing was continued until more than 5 horsepower hours of energy per long ton of dry chalk whiting had been dissipated therein. The suspension so produced had a viscosity of 12 poise and could be pumped and transported as a fluid suspension.

When the dispersing agent was not added, the chalk whiting formed a stiff putty-like mass which was completely unworkable in the mixer.

The suspension of chalk whiting prepared in accordance with the method of this invention was allowed to stand for a period of seven days, after which time, although the viscosity had increased to 20 poise, it was still pumpable. There was found to be no sedimentation of coarser particles to the bottom of the container, i.e., the solids content at the bottom and top of the suspension was still 78 percent. After 1 month there was still no appreciable sedimentation of the larger particles.

EXAMPLE 2

A sample of natural chalk pigment was prepared by grinding a mixture of lumps of crude chalk and water containing 0.1 percent by weight, based on the weight of dry chalk, of an ammonium polyacrylate dispersing agent having a number average molecular weight of 1,700. The grinding medium was flint pebbles having diameters in the range 5 – 40 mm and the grinding was continued for a time sufficient to disperse all the chalk in the water and to free it from nodules of hard flint. The chalk suspension which comprised 75 percent by weight of solids was then separated from the grinding pebbles and from the flint impurities and subjected to a further grinding operation using as the grinding medium particles of quartz sand of diameter 0.5 - 1.0 mm. The ground chalk was found to have a particle size distribution such that 75 percent by weight consisted of particles smaller than 2 microns equivalent spherical diameter and 0.03 percent by weight larger than 53 microns. Part of the suspension of ground chalk was dried in a spray drier to give a product containing 1 percent by weight of water and this was mixed with the undried suspension to increase the solids content to 80 percent by weight. The mixing was performed in a commerical Cellier mixer and a further 0.1 percent by weight of ammonium polyacrylate dispersing agent, based on the weight of dry chalk, was added. The electrical circuit providing power for the motor driving the Cellier mixer was provided with a Kilowatt hour meter and the quantity of energy consumed by the motor was noted. When a quantity of energy equivalent to about 4 horsepower hours per long ton of dry chalk had been dissipated in the suspension, the last of the dry chalk appeared to have been dispersed in the suspension but the suspension was viscous. After about 6 horsepower hours of energy per long ton of dry chalk had been dissipated in the suspension, the suspension became less viscous and was suitable for transport by pumping. The viscosity of the suspension was 16 poise at 22° C and after standing for 7 days had risen to 18 poise at 22° C. No appreciable sedimentation of the larger particles from the suspension had occurred after one month.

EXAMPLE 3 (COMPARISON)

A further suspension of chalk whiting was prepared by grinding a mixture of lumps of crude chalk and water containing 0.3 percent by weight based on the weight of dry chalk of tetrasodium pyrophosphate dispersing agent. The grinding medium was flint pebbles having diameters in the range of 5 - 40 mm and the grinding was continued for a time sufficient to disperse all the chalk in the water and to free it from nodules of hard flint. The chalk suspension which comprised 75 percent by weight of solids was then separated from the grinding pellets and from the flint impurities and subjected to a further grinding operation using as the grinding medium particles of quartz sand of diameter 0.5 - 1.0 mm. The ground chalk was found to have a particle size distribution such that 72 percent by weight consisted of particles smaller than 2 microns equivalent spherical diameter, 2 percent by weight of particles larger than 10 microns equivalent spherical diameter and 0.03 by weight larger than 53 microns. Part of the suspension of ground chalk was dried in a spray drier to give a product containing 1 percent by weight of water and this was mixed with the undried suspension to increase the solids content to 80 percent by weight. The mixing was performed in a commerical Cellier mixer and a further 0.1 percent by weight of tetrasodium pyrophosphate dispersing agent based on the weight of dry chalk was added. After about 6 horsepower hours of energy per long ton of dry chalk had been dissipated in the suspension, the viscosity was found to be 18 poise at 22° C. After standing for 7 days, the suspension had become so viscous that its viscosity could not be measured by the same method and it was unsuitable for transporting by pumping.

A further suspension was prepared in an identical manner except that there was used in the initial mixture instead of the tetrasodium phrophosphate a quantity of sodium silicate solution equivalent to 0.5 percent by weight of sodium silicate based on the weight of dry chalk. When the spray dried fine chalk was blended with the undried suspension a further 0.1 percent by weight of sodium silicate based on the weight of dry chalk was added. It was found that a sufficiently fluid suspension could not be prepared at a solids content of 80 percent. These results show that satisfactory results are not obtained when conventional dispersing agents such as tetrasodium pyrosphosphate and sodium silicate are used.

EXAMPLE 4

The chalk whiting used in Example 1 was dispersed in water using the method described in Example 1 except that there was used as the dispersing agent 0.2 percent by weight of a sodium polymethacrylate having a number average molecular weight of 2,050. The mixing was continued until 6 horsepower hours of energy per long ton of dry chalk had been dissipated in the suspension. The suspension so produced had a viscosity of 14 poise at 22° C. and after standing for 7 days had a viscosity of 20 poise at 22° C. No appreciable sedimentation of the larger particles from the suspension had occurred after 1 month.

EXAMPLE 5

Italian calcite marble chips ranging in size from about ¼ to about ½ inch were ground with water in a ball mill in the absence of a deflocculant to give a product having a particle size distribution such that it consisted of 26 percent by weight of particles larger than 53 microns, 75 percent by weight of particles larger than 10 microns equivalent apherical diameter and 6 percent by weight of particles smaller than 2 microns equivalent spherical diameter. 100 parts by weight of this product were then ground with 214 parts by weight of silica sand having particles of diameter in the range 0.5 to 1.0 mm and 43 parts by weight of water containing 0.45 percent by weight, based on the weight of the calcite marble, of a sodium polyacrylate dispersing agent having a number average molecular weight of 1,650. The mixture was contained in a cylindrical vessel provided with a central impeller which was rotated at a speed of 125 r.p.m. for a time of 8 hours. At the end of this time the calcite marble had a particle size distribution such that it consisted of 0.6 percent by weight of particles larger than 53 microns, 3 percent by weight of particles larger than 10 microns equivalent spherical diameter and 92 percent by weight of particles smaller than 2 microns equivalent spherical diameter. Part of the suspension was removed and dried to about 1 percent by weight of water in a spray drier and the dried material was mixed back into the suspension to give a solids content of 77 percent by weight. The mixing was performed in a commerical Cellier mixer and was continued until 6 horsepower hours of energy per long ton of dry calcite marble had been dissipated in the suspension. The suspension so produced was pumpable and had a viscosity of 5 poise at 22° C and after standing for 7 days had a viscosity of 8 poise at 22° C. No appreciable sedimentation of the larger particles had occurred after 1 month.

EXAMPLE 6

The chalk whiting used in Example 1 was dispersed in water using the method described in Example 1 except that there was used as the dispersing agent 0.3 percent by weight of the sodium salt of a copolymer of vinyl acetate and acrylic acid having a molar ratio of acrylic acid units to vinyl acetate units of 1.72:1 and a number average molecular weight of 3,800. The mixing was continued until 6 horsepower hours of energy per long ton of dry chalk had been dissipated in the suspension. The suspension so produced was pumpable and had a viscosity of 10 poise at 22° C, and after standing for 7 days had a viscosity of 18 poise at 22° C. No appreciable sedimentation of the larger particles had occurred after 1 month.

EXAMPLE 7

The calcite marble used in Example 5 was dispersed in water using the method described in Example 5 except that there was used as the dispersing agent 0.45 percent by weight of the sodium salt of a copolymer of vinyl acetate and methacrylic acid having a molar ratio of methacrylic acid units to vinyl acetate units of 1:1 and a number average molecular weight of 2,800. The mixing was continued until 6 horsepower hours of energy per long ton of calcite marble had been dissipated in the suspension. The suspension so produced was pumpable and had a viscosity of 9 poise at 22° C and after standing for 7 days had a viscosity of 14 poise at 22° C. No appreciable sedimentation of the larger particles had occurred after 1 month.

EXAMPLE 8

The calcite marble used in Example 5 was dispersed in water using the method described in Example 5 except that there was used as the dispersing agent 0.45 percent by weight of the sodium salt of a copolymer of vinyl chloride and acrylic acid having a molar ratio of acrylic acid units to vinyl chloride units of 10:1 and a number average molecular weight of 1,700. The mixing was continued until 6 horsepower hours of energy per long ton of dry calcite marble had been dissipated in the suspension. The suspension so produced was pumpable and had a viscosity of 13 poise at 22° C and after standing for 7 days had a viscosity of 19 poise at 22° C. No appreciable sedimentation of the larger particles had occurred after 1 month.

EXAMPLE 9

The chalk whiting used in Example 1 was dispersed in water using the method described in Example 1 except that there was used as the dispersing agent 0.2 percent by weight of the sodium salt of a copolymer of vinyl acetate and maleic acid having a molar ratio of vinyl acetate units to maleic acid units of 1.18:1 and a number average molecular weight of 1,650. The mixing was continued until 6 horsepower hours of energy per long ton of dry chalk had been dissipated in the suspension. The suspension so produced was pumpable and had a viscosity of 12 poise at 22° C and after standing for 7 days had a viscosity of 17 poise at 22° C. No appreciable sedimentation of the larger particles had occurred after 1 month.

EXAMPLE 10

The chalk whiting used in Example 1 was dispersed in water using the method described in Example 1 except that there was used as the dispersing agent 0.3 percent by weight of the sodium salt of a copolymer of styrene and maleic acid having a molar ratio of maleic acid units to styrene units of 1:1 and a number average molecular weight of 2,700. The mixing was continued until 6 horsepower hours of energy per long ton of dry chalk had been dissipated in the suspension. The suspension so produced was pumpable and had a viscosity of 8 poise at 22° C. No appreciable sedimentation of the larger particles had occurred after 1 month.

EXAMPLE 11

The calcite marble used in Example 5 was dispersed in water using the method described in Example 5 except that there was used as the dispersing agent the sodium salt of the methyl half ester of the copolymer of vinyl acetate and maleic acid described in Example 9. (The methyl half ester was formed by dissolving the copolymer in methyl alcohol at room temperature, drying the solution at 60° C under vacuum and grinding the resultant glassy solid to a fine powder.) The quantity of this dispersing agent used was 0.45 percent by weight based on the weight of dry calcite marble. The mixing was continued until 6 horsepower hours of energy per long ton of dry calcite marble had been dissipated in the suspension. The suspension so produced was pumpable and had a viscosity of 5 poise at 22° C and after standing for 7 days had a viscosity of 9 poise at 22° C. No appreciable sedimentation of larger particles had occurred after 1 month.

EXAMPLE 12

Three samples of natural chalk whiting were prepared. Each sample had a particle size distribution such that the proportion by weight of particles smaller than 2 microns equivalent spherical diameter was the same, namely 75 percent by weight, but the proportion by weight of particles larger than 53 microns was different in each case, namely 0.02 percent, 0.2 percent and 5.0 percent by weight respectively. Each sample was mixed with water containing 0.3 percent by weight of a sodium polyacrylate dispersing agent having a number average molecular weight of 1,650, the quantity of water being such as to give a suspension containing 75 percent by weight of solids. Agitation of the aqueous suspension was continued until the amount of energy dissipated in the suspension during the mixing operation was 10 horsepower hours per long ton of dry chalk. The suspension were each kept in a covered container for 1 month, at the end of which period the bottoms of the containers were examined. The sample of whiting having 0.02 percent larger than 53 microns was found to have formed no sediment, the sample having 0.2 percent larger than 53 microns gave a very slight sediment and the sample having 5.0 percent larger than 53 microns gave a thick, solid sediment.

EXAMPLE 13

Samples of a natural chalk whiting, having a particle size distribution such that 75 percent by weight consisted of particles smaller than 2 microns equivalent spherical diameter and 0.02 percent by weight consisted of particles larger than 53 microns, were mixed with different quantities of water to give suspensions containing 68 percent, 75 percent and 86 percent by weight respectively of solids. The suspensions contained 0.3 percent, 0.3 percent and 0.3 percent by weight respectively, based on the weight of dry chalk, of a sodium polyacrylate dispersing agent having a number average molecular weight of 1,650, and the amounts of energy dissipated in the suspensions during the mixing operation were 10, 10 and 10 horsepower hours respectively per long ton of dry chalk. The suspension containing 86 percent by weight of solids formed a gel which could not be pumped or handled conveniently in any other way. The other two suspensions were kept in covered containers for 1 month, at the end of which period the bottom of each container was examined. Appreciable sedimentation was found to have taken place in the case of the suspension containing 68 percent by weight of solids, but there was no apparent sedimentation with the suspension containing 75 percent by weight of solids.

What is claimed is:

1. A method of preparing a stable suspension of a natural calcium carbonate pigment in water which comprises (a) forming an aqueous suspension containing from 70 to 85 percent by weight of the natural calcium carbonate pigment, the natural calcium carbonate pigment comprising not more than 1 percent by weight of particles having an equivalent spherical diameter larger than 53 microns and no particles having an equivalent spherical diameter larger than 100 microns, and from 0.05 to 0.5 percent by weight, based on the weight of the natural calcium carbonate pigment, of a dispersing agent which is a water-soluble salt of an anionic polymer which has a number average mocular weight less than 10,000 and which contains from 30 to 100 molar percent of repeating units which can be represented by the formula:

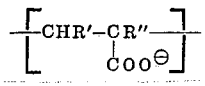

wherein R' is hydrogen, a carboxylic acid group or a methyl carboxylate group and R'' is hydrogen or a methyl group, and from zero to 70 molar percent of repeating units which can be represented by the formula:

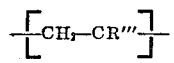

wherein R''' is chlorine, a methyl carboxylate group or phenyl; and (b) thoroughly agitating said suspension in the presence of the dispersing agent until there has been dissipated in the suspension at least 5 horsepower hours of energy per long ton of dry natural calcium carbonate pigment.

2. A method according to claim 1, wherein the polymeric anion of the dispersing agent has a number average molecular weight in the range 1,000 to 5,000.

3. A method according to claim 1, wherein the dispersing agent is a water-soluble salt of a poly(acrylic acid) or of a poly(methacrylic acid).

4. A method according to claim 1, wherein the dispersing agent is a water-soluble salt of a copolymer of acrylic acid and vinyl acetate or vinyl chloride, of methacrylic acid and vinyl acetate, or of maleic acid and styrene or vinyl acetate.

5. A method of preparing a stable suspension of a calcium carbonate whiting in water which comprises (a) forming an aqueous suspension containing (i) from 70 to 85 percent by weight of calcium carbonate whiting, the calcium carbonate whiting comprising not more than 1 percent by weight of particles having an equivalent spherical diameter larger than 53 microns and no particles larger than 100 microns, and (ii) a dispersing agent selected from the group consisting of water-soluble salts of poly(acrylic acid) and water-soluble salts of poly(methacrylic acid), the polymeric anion of said dispersing agent having a number average molecular weight in the range 1,000 to 5,000 and said dispersing agent being present in an amount in the range of from 0.05 to 0.50 percent by weight based on the weight of dry calcium carbonate whiting in the suspension, and (b) thoroughly agitating said suspension containing said dispersing agent until there has been dissipated in the suspension at least 5 horsepower hours of energy per long ton of dry calcium carbonate whiting.

* * * * *